United States Patent Office 3,522,225
Patented July 28, 1970

3,522,225
VULCANIZATION OF ELASTOMERIC OLEFINIC COPOLYMERS WITH ORGANIC DIPEROXIDES
Cesare Augusto Peri, Giorgio Sugni, and Augusto Portolani, Milan, and Giuliano Ballini, Ferrara, Italy, Robert Hügel, Mainz, Germany, and Spartaco Fontani, Milan, Italy, assignors to Montecatini Edison S.p.A., Milan, Italy
No Drawing. Continuation of application Ser. No. 628,230, Mar. 30, 1967, which is a continuation-in-part of application Ser. No. 160,665, Dec. 19, 1961. This application Mar. 5, 1969, Ser. No. 806,029
Int. Cl. G08f 15/04
U.S. Cl. 260—88.2                                    15 Claims

ABSTRACT OF THE DISCLOSURE

Vulcanizable composition of (1) a vulcanizable polymer which is either a saturated elastomeric copolymer of ethylene with a higher alpha-olefin having the formula $CH_2=CHR$ in which R is a lower alkyl radical, the copolymer having an ethylene content of from about 5 to 70 mol percent, or a low unsaturation terpolymer of ethylene with propylene or butene-1 and with a cyclic non-conjugated polyene, the terpolymer having an ethylene content of from about 20 to 80 mol percent and a polyene content of from about 0.1 to 20 mol percent, the molecular weight of the polymer being between about 60,000 and 800,000; (2) a diperoxide having the general formula:

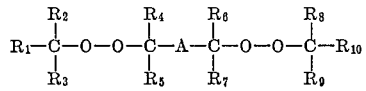

in which $R_2$ to $R_9$, inclusive, are selected from the group consisting of unsubstituted and halogen-substituted lower alkyl radicals, $R_1$ and $R_{10}$ are selected from the group consisting of unsubstituted and substituted alkyl radicals containing from 1 to 6 carbon atoms and unsubstituted and substituted aromatic radicals containing from 6 to 20 carbon atoms, and A is an arylene radical selected from the group consisting of phenylene, diphenylene and naphthylene, in a concentration of from about 0.002 to 0.02 mol of diperoxide per 100 grams of the vulcanizable copolymer or terpolymer; and (3) a radical acceptor selected from the group consisting of sulfur, quinone compounds and dimaleimidic compounds, in a concentration of from 0.1 to 20 grams per 100 grams of the vulcanizable copolymer or terpolymer.

Process for vulcanizing this composition comprising homogenizing it and vulcanizing at a temperature of from about 110° C. to 260° C. Particularly rapid vulcanization rates may be obtained at temperatures of from about 200 to 250 or 260° C.; such high temperature vulcanizations may be conducted in an injection press or in a liquid eutectic salt mixture.

CROSS-REFERENCE TO RELATED APPLICATION

This application is a continuation of application Ser. No. 628,230, filed Mar. 30, 1967, now abandoned which latter application is in turn a continuation-in-part of application Ser. No. 160,665, filed Dec. 19, 1961, now abandoned.

BACKGROUND OF THE INVENTION

Field of the invention

The present invention relates to the use of new organic diperoxides in the vulcanization of olefin copolymers and to methods for preparing the new diperoxides.

Description of the prior art

It is known that organic monoperoxides are useful as generators of free radicals and, therefore, as initiators of free-radical polymerization reactions.

Another peculiar characteristic of peroxidic substances is that they are, in general, good cross-linking agents for vulcanization mixes containing natural and synthetic copolymers. The products generally used for this purpose contain in their molecules a peroxidic function, —O—O—, and have the general formula:

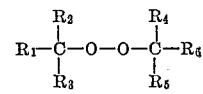

in which the R radicals are aryl, alkyl, substituted aryl, or substituted alkyl radicals, hydrogen, ether radicals, cycloalkyl radicals, etc.

Many of these monoperoxides have a relatively high vapor pressure which results in their loss by evaporation, to a certain extent, during compounding and storage of the mixes.

There are also known some other types of peroxides which contain in their molecule two peroxidic groups and have a low vapor pressure, for example, substances having the following general formulae:

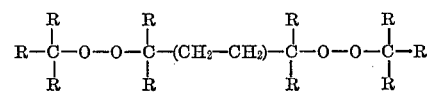

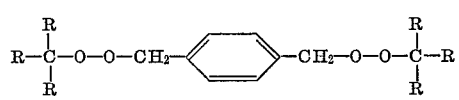

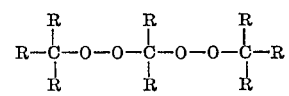

in which the R radicals are the same or different hydrocarbon residues. When such diperoxides are used in the vulcanization of saturated copolymers, e.g., copolymers of ethylene with propylene and/or butene, all of said diperoxides show a cross-linking effectiveness which corresponds at most to the effectiveness of the same molar concentration of a monoperoxide (e.g., dicumyl peroxide), that is, as if only one peroxidic radical were present in the molecule.

SUMMARY OF THE INVENTION

The present invention provides vulcanizable compositions comprising elastomeric copolymers of ethylene and new peroxidic compounds characterized by the presence of two peroxidic groups, —O—O—, in their molecule and by a relatively low vapor pressure, and which are highly effective vulcanizing agents for vulcanizable polymers, as well as a process for vulcanizing these compositions.

More particularly, the present invention provides a vulcanizable composition comprising (1) a vulcanizable polymer selected from the group consisting of (a) a saturater elastomeric copolymer of ethylene with a higher alpha-olefin having the formula $CH_2=CHR$ in which R is a lower alkyl radical, said copolymer having an ethylene content of from about 5 to 70 mol percent and (b) a low unsaturation terpolymer of ethylene with propylene or butene-1 and with a cyclic or acyclic non-conjugated polyene, said terpolymer having an ethylene content from about 20 to 80 mol percent and a polyene content of from about 0.1 to 20 mol percent, the molecular weight of said polymer being about 60,000 and 800,000; (2) a diperoxide having the general formula:

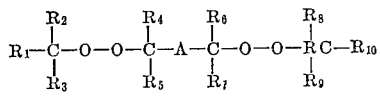

in which $R_2$ to $R_9$, inclusive, are selected from the group consisting of unsubstituted and halogen-substituted lower alkyl radicals, $R_1$ and $R_{10}$ are selected from the group consisting of unsubstituted alkyl radicals containing from 1 to 6 carbon atoms and unsubstituted and substituted aromatic radicals containing from 6 to 20 carbon atoms, and A is an arylene radical, selected from the group consisting of phenylene, diphenylenea nd naphthylene, in a concentration of from about 0.002 to 0.02 mol of diperoxide per 100 grams of said vulcanizable copolymer or terpolymer; and (3) a radical acceptor selected from the group consisting of sulfur quinone compounds and dimaleimidic compounds, in a concentration of from 0.1 to 20 grams per 100 grams of the vulcanizable copolymer or terpolymer.

The present invention also provides a vulcanization process which comprises homogenizing the above composition and vulcanizing it at a temperature of from about 110° C. to 260° C.

DESCRIPTION OF THE PREFERRED EMBODIMENTS

Preferred copolymers for vulcanization in accordance with the present invention include the linear rubbery copolymers of ethylene with propylene and/or butene-1 in which ethylene is present in an amount of from about 5 to 70%, preferably 25 to 65%, by weight and which are substantially amorphous as determined by X-ray diffraction.

Preferred low unsaturation terpolymers include polymers of ethylene with propylene and/or butene-1 and with a cyclic or acyclic polyene having non-conjugated double bonds. Polyenes which are particularly suitable for use in preparing the terpolymers include pentadiene-1,4, hexadiene-1,4, hexadiene-1,5, heptadiene-1,5, dodecatriene-1,7,9, 5-methylen-norbornene, norbornadiene-2,5, 2-alkylnorbornadiene-2,5, cyclooctadiene-1,5, dicyclopentadiene, 4,7,8,9-tetrahydroindene, 5-methyl-4,7,8,9-tetrahydroindene, 5,6 - dimethyl - 4,7,8,9-tetrahydroindene, etc. Particularly preferred vulcanizable terpolymers inlcude the ethylene/propylene/5-methyl-4,7,8,9-tetrahydroindene and ethylene/butene-1/5-methyl-4,7,8,9-tetrahydroindene terpolymers.

The molecular weight of the vulcanizable copolymer or terpolymer may be of the order of between about 60,000 and about 800,000, preferably between about 70,000 and 500,000.

A particularly important feature of the present invention is the discovery that, surprisingly, both peroxidic groups, —O—O—, of the new diperoxides participate in the cross-linking, so that the cross-linking effectiveness for the polymer is, at the same molar concentration, almost twice that of the most effective monoperoxides of the prior art.

The cross-linking takes place through a thermal breakdown into four free radicals all of which are capable of abstracting hydrogen from the polymer chains without undergoing undesired side reactions of any appreciable extent.

In comparison with the conventional monoperoxides with the same peroxidic oxygen content, the diperoxides of the present invention also have the advantage that they do not have the high volatility which is typical of the low molecular weight monoperoxides and can be used at the usual working temperatures without any appreciable evaporation from the mass.

Moreover, due to the low volatility and good cross-linking efficiency even at high temperature of the new diperoxides, the compositions of the present invention can be vulcanized at temperatures considerably higher than those heretofore employed in the conventional vulcanization press, these higher temperatures being in the range of from about 180–269° C. Great economic advantage is afforded by these vulcanization temperatures inasmuch as the vulcanization time is thereby sharply reduced.

In addition, in accordance with a particularly preferred feature of the present invention, the high temperature vulcanization may be conducted in an injection press or a eutcetic salt mixture, e.g., Du Pont's "Hitec," comprising 40% $NaNO_2$, 7% $NaNO_3$ and 53% $KNO_3$. The vulcanization process may be performed also as a continuous process by extruding the vulcanizable composition of the inventions, and passing the extrudate through the eutetic salt mixture at a temperature of from about 180° to 260° C., preferably 200 to 260° C., more preferably 205 to 250° C., for from about 30 seconds to 6 minutes. This continuous high temperature vulcanization process affords a great economic advantage in markedly reducing both the vulcanization time and waste. In addition, it is possible to more accurately control the size and shape of the vulcanizates, and to avoid deformation of even thin delicately shaped extrudates during vulcanization, while at the same time obtaining bright surfaces.

In addition to the fact that both peroxidic functions are involved in the vulcanization, the new diperoxide compounds exhibit stability to heat and impact, which stability, however, does not impair their capacity to form free radicals.

The diperoxides of the present invention have the general formula:

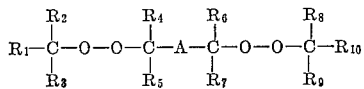

in which $R_2$ and $R_9$ are lower alkyl radicals in which the hydrogen atoms may be partially substituted with halogens; $R_1$ and $R_{10}$ are selected from the group consisting of lower alkyl radicals containing from 1 to 6 carbon atoms in which the hydrogen atoms may be partially substituted with halogens, and aromatic radicals containing from 6 to 20 carbon atoms in which the hydrogen atoms may or may not be substituted with alkyl, aryl or cycloalkyl radicals or with halogens; and —A— is an arylene radical selected from the group consisting of phenylene, diphenylene or naphthylene. According to a preferred feature of the invention, $R_2$ to $R_9$ contain from 1 to 6 carbon atoms and, more preferably, are methyl groups.

For preparing the organic diperoxides of the invention, it has been found particularly useful to react an organic hydroperoxide (1) With a hydrocarbon containing two mobile hydrogen atoms in the presence of a catalyst which is a transition metal salt of the kind used in the method of Kharasch et al. (J. Org. Chem. 24, 72, 1959); or (2) With an alkyl carbinol containing two tertiary alcohol functions in the presence of an acid condensing agent.

In the first alternative process, the reaction of the hydroperoxide with the hydrocarbon takes place according to the scheme:

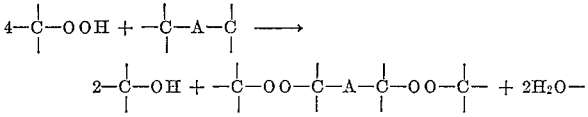

In this process, however, the organic hydroperoxide must be introduced gradually, at a controlled rate and at the reaction temperature, into the agitated catalyst-hydrocarbon mixture.

The conventional method of preparing monoperoxides, in which a mixture of the two main reactants is heated in the presence of the catalyst (see the aforementioned work of Kharasch et al.), cannot be used because of the strong and uncontrollable reactions which occur. The separation of the diperoxides thus obtained from the reaction mixtures is carried out by evaporation under vacuum, fractional crystallization, or in any other suitable way.

Preferably, the separation is carried out by washing the reaction mixture with dilute acid solution. Two layers form as a result of such washing, an aqueous layer and a non-aqueous layer. The aqueous layer contains the catalyst and the water soluble products; the non-aqueous layer in which the diperoxide is dissolved is separated easily from the aqueous layer, and is subjected to a vacuum distillation to remove other water insoluble by-products. If desired, the residue containing the diperoxide may be further purified by solvent crystallization or by another method such as counter-current solvent partition or by chromatographic separation.

Organic hydroperoxides which may be used include: tert-butyl hydroperoxide, $\alpha,\alpha'$ - dimethyl - benzylhydroperoxide, $\alpha,\alpha'$-dimethyl-phenyl-benzylhydroperoxide, $\alpha,\alpha'$-isopropylnaphthyl-hydroperoxide and the like.

As the hydrocarbon containing two mobile hydrogen atoms, there may be used, for example, diisopropyl benzene, diisopropyl diphenyl, diisopropyl naphthalene, diisopropyl anthracene, diisopropyl terphenyl, diisopropyl tetrahydronaphthalene, diisobutyl benzene, diisoamyl benzene, diisobutylnaphthalene and the like.

Suitable catalysts include, e.g., halides of Cu, Mn and Co and metalorganic compounds such as Cu-dodecylbenzene sulfonate, Co-acetylacetonate and Co-naphthenate. Preferred catalysts include copper chloride and manganese chloride.

At least 4 mols of organic hydroperoxide are used per mol of hydrocarbon.

The organic hydroperoxide and hydrocarbon are reacted at a temperature of from about 40° C. to 120° C., preferably from about 70° to 90° C.

In the second alternative process for preparing the organic diperoxides, the hydroperoxide, which may be represented by the formula:

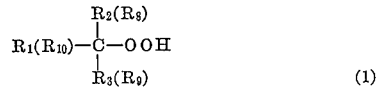

is reacted with a tertiary dialcohol having a central nucleus A, which may be represented by the formula:

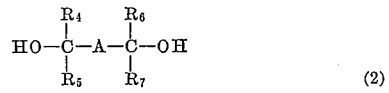

(wherein $R_2$—$R_9$, $R_1$, $R_{10}$ and A are as defined above) according to the scheme:

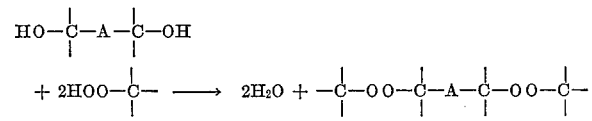

The reaction is carried out by dissolving or suspending the teritary dialcohol (2) and the hydroperoxide (1) in an alcohol, ketone or strong organic acid, and by adding an acid condensing agent to the solution or suspension while agitating, at temperatures between about 0° C. and 80° C.

Generally, one mol of the alcohol is reacted with at least two mols of the hydroperoxide.

Preferably, the strong organic acid is propionic acid or acetic acid, while the acid condensing agent is selected from the group consisting of perchloric acid, $H_2SO_4$, benzenesulfonic acid and boron trifluoride.

The aryl aridcal of the tertiary dialcohol may be benzene, diphenyl, naphthalene, anthracene or the like.

Outstanding and unpredictable advantages are obtained by using the new diperoxidic compounds in the vulcanization of synthetic polymers and of natural rubber.

The saturated copolymers of ethylene with higher alpha-olefins such as propylene and/or butene-1 as well as the low unsaturation tempolymers are vulcanized by using, as cross-linking agents, the organic diperoxides together with an auxiliary vulcanizing aid acting as a radical acceptor; this radical acceptor is selected from the group consisting of sulfur, quinone compounds and dimaleimidic compounds and is used in amounts from 0.1 to 20 parts by weight per 100 parts of copolymer or terpolymer. Sulfur is the preferred auxiliary aid. We have found that the use of a small amount of sulfur together with the diperoxides greatly increases the effectiveness of said diperoxides as vulcanization agents.

The most remarkable advantages obtained by using the present new diperoxides in the vulcanization of mixes containing olefin polymers can be summarized as follows:

(1) The possibility of using the new diperoxides in lower concentrations, to obtain vulcanized products having the same characteristics;

(2) The possibility of vulcanizing at higher temperatures than those heretofore employed, to thereby markedly reduce the vulcanization time;

(3) The reduction of the residual odor in the vulcanized product as a consequence of the lower concentration of vulcanizing agent which can be used efficiently, and of the lower volatility of the by-products thereof;

(4) Easy mixing of the diperoxides with rubbery polymers due to the crystalline character of the new diperoxides and their very low volatility;

(5) Absence of scorching due to the relatively high "decomposition point" of the diperoxides;

(6) Good vulcanization rate at the temperatures normally used in the rubber industry;

(7) Vulcanization homogeneity, due not only to the absence of scorching, but also to the relatively low melting point and to the solubility of the new diperoxides in the molten polymers;

(8) The possibility of using additives commonly used in the rubber industry, such as carbon black, silica, clay, plasticizers, etc., without altering the greater vulcanizing effectiveness of the new diperoxides.

The vulcanizable mixtures of the present invention can be prepared in any apparatus commonly used for mechanical mixing in the rubber industry. The vulcanization can be carried out advantageously in the apparatus commonly used in the rubber industry for heating and shaping purposes.

The diperoxide concentration essentially depends upon the characteristics desired for the vulcanized products and is usually between 0.002 and 0.02 mol of peroxide per 100 g. of the copolymer or terpolymer to be vulcanized.

Usually, the vulcanization can be carried out in a reasonable time at temperatures of from 110° to 260° C., preferably, from 150° to 200° C. A remarkable reduction in vulcanization time is achieved in accordance with a preferred embodiment employing temperatures of the order of about 200° to 260° C., preferably, 205° to 250° C.

Excellent vulcanization results are obtained when the concentration of sulfur to diperoxide is from about 0.6 to 3, preferably from about 1.6 to 2.0, gram atoms of sulfur per mol of diperoxide. Obviously, this does not exclude the use of sulfur concentrations not within said range, for particular purposes.

When auxiliary substances are added not only for their protective effect but also in order to reinforce or modify the mechanical properties of the vulcanized products, as in the case of diene polymers having a vinyl unsaturation, and of vinyl monomers, the concentration, which can vary within wide limits, is determined by the particular effects to be achieved.

The diperoxides of the present invention are useful, also, for the vulcanization of other saturated or unsaturated elastomers generally, provided the latter can be vulcanized with organic peroxides. The new diperoxides can be used in admixture with each other or with monoperoxides. Moreover, they can be added to rubber either alone or mixed or diluted with inert material in the form of powder, paste or a solution.

The following examples illustrate the present invention without limiting its scope.

EXAMPLE 1

Into a 1000 cc. flask provided with an agitator, thermometer, reflux condenser and an inlet cock funnel, 162 g. of p-diisopropyl benzene and 8 g. $CuCl_2$ were introduced under nitrogen.

The mixture was heated to 75–80° C. while agitating under nitrogen, and then, while maintaining this temperature, 490 g. of 73%-tert.butyl-hydroperoxide were gradually added over a period of 20 hours.

After the addition was completed, the agitation and heating were continued until almost all the hydroperoxide (at least 90%) disappeared.

While still maintaining the 75–80° C. reaction temperature, 200 cc. of an aqueous solution containing 3% HCl were added. Two layers were formed. The lower aqueous layer was discarded and the upper layer washed, while warm, with water until it was neutralized. It was then subjected to vacuum distillation at a pressure of 15/20 mm. of mercury and a temperature of 78–80° C. to eliminate the volatile substances. From the residue, by methanol crystallization, there were obtained 140 g. of a crystalline substance having a melting point of 75–76° C. and corresponding to the formula:

$$CH_3-\underset{\underset{CH_3}{|}}{\overset{\overset{CH_3}{|}}{C}}-O-O-\underset{\underset{CH_3}{|}}{\overset{\overset{CH_3}{|}}{C}}-\!\!\!\!\bigcirc\!\!\!\!-\underset{\underset{CH_3}{|}}{\overset{\overset{CH_3}{|}}{C}}-O-O-\underset{\underset{CH_3}{|}}{\overset{\overset{CH_3}{|}}{C}}-CH_3$$

($\alpha,\alpha'$-bis (tert.butyl peroxy)-p-diisopropylbenzene).

The analytical data agree with the aforementioned formula and are as follows:

carbon content (C%) = 17.32% (calculated = 70.96%);
hydrogen content (H%) = 9.81% (calculated = 10.13%);
cryoscopic molecular weight (M.W.), found = 338 (calculated = 338.51).

EXAMPLE 2

0.2 g. of perchloric acid were added to a solution of 19.4 g. of ($\alpha,\alpha'$-dihydroxy)diisopropylbenzene (melting point 142° C.) in 40 cc. of glacial acetic acid and 24.1 g. of 75% tert.butyl hydroperoxide, kept at room temperature. After a few minutes, a crystalline substance precipitated and was then isolated by filtration after dilution with water.

28.5 g. $\alpha,\alpha'$-bis (tert.butylperoxy)-1,4-diisopropylbenzene, having the characteristics of the product described in Example 1, were obtained.

EXAMPLE 3

By operating in a manner similar to that described in Example 1, but using alpha-cumyl hydroperoxide instead of tert. butyl hydroperoxide, the product corresponding to the formula $\alpha,\alpha'$-bis (cumyl peroxy)-p-diisopropylbenzene:

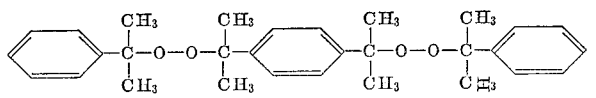

was obtained. It is a pale amber colored liquid having the following characteristics:

Density at 20° C. _____ 1.008
Refractive index $n_D^{20}$ _____ 1.5318
Active substance content, percent _____ 57

EXAMPLE 4

To an agitated suspension of 238.4 g. of a mixture of diisopropyldiphenyl isomers and 8 g. of cuprous chloride, at a temperature of 80° C., 480 g. of tert.butyl hydroperoxide (75% solution) were added over 3 hours.

The agitation and the heating were continued for an additional 3 hours and, after cooling, the catalyst was separated by filtration under vacuum. The filtrate was then concentrated at 95° C. and at a pressure of 0.5 mm./Hg. 319 g. of a viscous liquid having the following characteristics were obtained:

$D_{20}$ _____ 1.03
$n_D^{20}$ _____ 1.5448

The liquid contained 64.7% $\alpha,\alpha'$-bis (tert.butylperoxy) diisopropyl-diphenyl:

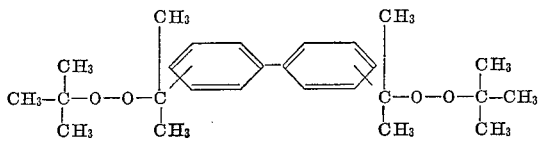

EXAMPLE 5

Proceeding as in Example 4, but using diisopropyldiphenyl and cumyl hydroperoxide, the following product was obtained:

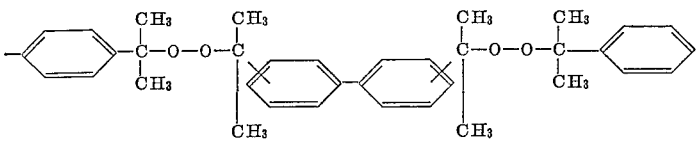

$\alpha,\alpha'$-bis (cumyl peroxy) diisopropyl-diphenyl.

Density at 20° C. _____ 1.058
Refractive index $n_D^{20}$ _____ 1.5723

EXAMPLE 6

Analogously, using 2,5-diisopropylnaphthalene and tert. butyl hydroperoxide, the following product was obtained:

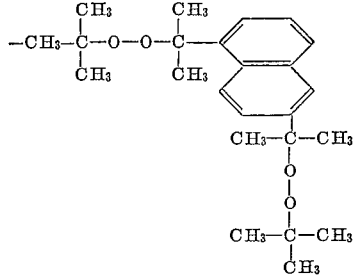

$\alpha,\alpha'$-bis (tert.butyl peroxy)-2,5-diisopropylnaphthalene.

EXAMPLE 7

From an ethylene-propylene copolymer, containing 45% by mols of propylene and having a Mooney viscosity of 50 ML (1+4) at 100° C., the following mixes (Table I) were prepared in a roll mixer and were then vulcanized in a steam press in the form of sheets having the dimensions 120 x 120 x 2 mm.

From these sheets, C-type test pieces (ASTM D-412) were cut and subjected to tensile tests in an Amsler-type dynometer with a rate of separation of the grips of 500 mm. per minute, to determine the tensile strength, elongation at break and modulus at 300%. The residual elongation was determined on special specimens having a useful portion of 5 cm., kept for 1 hour under a tension with an elongation of 200% and measured 1 minute after releasing.

The results are given in the lower part of Table I.

EXAMPLE 9

An ethylene-propylene-butene terpolymer containing 5% by mols of butene and 38% by mols of propylene and having a visocsimetric average molecular weight of

TABLE I

|  | a | b | c | d | e | f | g | h | i |
|---|---|---|---|---|---|---|---|---|---|
| Ethylene-propylene copolymer, g | 100 | 100 | 100 | 100 | 100 | 100 | 100 | 100 | 100 |
| Carbon black HAF, g | 50 | 50 | 50 | 50 | 50 | 50 | 50 | 50 | 50 |
| Sulfur, gram-atoms | 0.00962 | 0.00962 | 0.00962 | 0.00962 | 0.00962 | | | | |
| Cumyl peroxide, mols | 0.00962 | | | | | | | | 0.00962 |
| 2,5-bis (tert.butyl peroxy)-2,5-dimethylhexane (Varox), mols | | 0.00481 | 0.00962 | | | 0.00962 | | | |
| $\alpha,\alpha'$-bis(tert.butyl peroxy)p-diisopropylbenzene, mols | | | | 0.00481 | | | 0.00481 | | |
| $\alpha,\alpha'$-bis(cumyl peroxy) diisopropylbenzene, mols | | | | | 0.00481 | | | 0.00481 | |
| Mooney scorch time at 165° C | 2'25" | | 3'50" | 3'15" | 2'47" | | | | |
| Characteristics of the vulcanized products (60 min. at 165° C.): | | | | | | | | | |
| Tensile strength, kg./cm.² | 187 | 130 | 185 | 210 | 198 | 65 | 100 | 112 | 114 |
| Elongation at break, percent | 395 | 630 | 390 | 410 | 405 | 410 | 450 | 420 | 410 |
| Modulus at 300%, kg./cm.² | 128 | 48 | 130 | 129 | 124 | 50 | 68 | 69 | 67 |
| Residual elongation at 200%, percent | 6 | 20 | 6 | 6 | 5.5 | 38 | 22 | 20 | 21 |

It is evident from Table I that the diperoxides of the present invention, $\alpha,\alpha$-bis(tert.butyl peroxy) p-disopropylbenzene and $\alpha,\alpha$-bis(cumyl peroxy)-diisopropylbenzene, have a vulcanizing effectiveness twice as high as that of monoperoxides (e.g., cumyl peroxide) and of the known conventional diperoxide (e.g., 2,5-bis (tert.butyl peroxy) 2,5-dimethylhexane).

From an examination of the mechanical characteristics the vulcanized products, it appears that the products obtained from mixes a, c, d and e present the same degree of vulcanization (see modulus, elongation at break, residual elongation, etc.), although mixes d and e have a concentration of the diperoxide of the present invention which is only 50% of the concentration of the conventional diperoxide (mix c) or of the monoperoxide (mix a).

The products of mix b, on the contrary, have a very low degree of vulcanization as compared with those obtained from mixes a, c, d and e, since mix b contains a conventional diperoxide (Varox) with a concentration corresponding to 50% of that used in the comparison mix a. This shows that when using the same molar concentration of a conventional diperoxide (Varox) and of the diperoxides of the present invention, the vulcanizing activity is twice as high in the case of the diperoxides of this invention.

From an examination of the results reported in Table I, columns f, g, h and i, in which the mixes do not contain sulfur, with the results in columns c, e, d and a, respectively, it can be seen that the diperoxides of this invention have much greater vulcanizing effectiveness in the presence of sulfur and that the presence of sulfur in the mix improves the characteristics of the vulcanized products.

Analogous results were obtained also with the diperoxides of Examples 4 and 5.

EXAMPLE 8

From an ethylene-butene copolymer containing 34% by mols of ethylene and having a viscosimetric average molecular weight of 142,000, the vulcanized products described in Table II were obtained, by operating as described in Example 7.

TABLE II

| Ethylene-butene copolymer, g | 100 | 100 | 100 |
|---|---|---|---|
| Carbon black HAF, g | 50 | | |
| Sulfur, gram-atoms | 0.00481 | 0.00962 | 0.00962 |
| Cumyl peroxide, mols | 0.00481 | 0.00962 | |
| $\alpha,\alpha'$-bis(tert. butylperoxy) diisopropylbenzene, mols | | | 0.00481 |
| Characteristics of the products, vulcanized at 165° C. for 40 min.: | | | |
| Tensile strength, kg./cm.² | 128 | 193 | 201 |
| Elongation at break, percent | 650 | 430 | 445 |
| Modulus at 300%, kg./cm.² | 37 | 113 | 111 |
| Residual elongation at 200%, percent | 22 | 7.5 | 7 |

160,000, was vulcanized as in Example 7. The results are reported in Table III.

TABLE III

| Ethylene-propylene-butene copolymer, g | 100 | 100 | 100 |
|---|---|---|---|
| Carbon black, g | 50 | 50 | 50 |
| Sulfur, gram-atoms | 0.00962 | 0.00962 | 0.00962 |
| 2,5-bis(tert.butylperoxy)-2,5-dimethyl hexane(Varox), mols | 0.00481 | 0.00962 | |
| $\alpha,\alpha'$-bis(cumyl peroxy) diisopropylbenzene, mols | | | 0.00481 |
| Characteristics of the products, vulcanized at 165° C. for 60 min.: | | | |
| Textile strength, kg./cm.² | 104 | 201 | 198 |
| Elongation at break, percent | 720 | 460 | 475 |
| Modulus at 300%, kg./cm.² | 31 | 105 | 105 |
| Residual elongation at 200%, percent | 25 | 8 | 8 |

EXAMPLE 10

From an ethylene-propylene copolymer containing 51% by mols of propylene and having a viscosimetric average molecular weight of 132,000, the following vulcanized products were prepared and tested as described in Example 7:

|  | Parts |
|---|---|
| Ethylene-propylene copolymer | 100 |
| Carbon black HAF | 50 |
| $\alpha,\alpha'$ - bis(tert.butyl peroxy) diisopropylbenzene (0.00481 mol) | 1.63 |
| Sulfur | Varying |

The results using different amounts of sulfur are reported in Table IV.

TABLE IV

| Sulfur | | Tensile strength, kg./cm.² | Elongation at break, percent | Modulus at 300%, kg./cm.² | Residual elongation at 200, percent |
|---|---|---|---|---|---|
| Parts percent | Gram-atoms per mole of peroxide | | | | |
| 0.00 | | 122 | 430 | 74 | 21 |
| 0.10 | 0.64 | 173 | 420 | 105 | 11 |
| 0.15 | 0.97 | 193 | 420 | 123 | 8 |
| 0.20 | 1.29 | 201 | 410 | 124 | 7 |
| 0.25 | 1.62 | 215 | 400 | 132 | 6.5 |
| 0.30 | 1.94 | 210 | 425 | 128 | 7.5 |
| 0.40 | 2.59 | 204 | 430 | 102 | 8 |
| 0.50 | 3.24 | 205 | 470 | 97 | 8.5 |
| 0.60 | 3.88 | 202 | 540 | 93 | 9 |
| 0.80 | 5.18 | 209 | 610 | 67 | 11 |
| 1.00 | 6.48 | 193 | 700 | 54 | 13 |

EXAMPLE 11

From an ethylene-propylene copolymer of Example 10 the following mixes were prepared and then vulcanized and tested as in Example 7.

|  | a | b | c | d | e | f |
|---|---|---|---|---|---|---|
| Copolymer, parts | 100 | 100 | 100 | 100 | 110 | 100 |
| Clay, parts |  |  |  |  |  | 100 |
| Carbon black HAF, parts |  |  |  |  | 50 |  |
| Carbon black EPC, parts |  |  |  | 30 |  |  |
| SiO$_2$ (Ultrasil), parts |  |  | 25 |  |  |  |
| Magnesium dioxide, parts |  |  | 2 |  |  | 2 |
| Diphenyl guanidine, parts |  |  | 1 |  |  | 1 |
| Diethylene glycol, parts |  |  | 1 |  |  | 1 |
| Liquid polybutadiene (Buna 32), parts | 20 | 10 |  |  |  | 5 |
| Divinylbenzene, parts |  | 40 |  | 5 |  |  |
| p-Quinonedioxime dibenzoate, parts |  |  |  |  | 1.6 |  |
| Sulfur, parts |  |  | 0.24 | 0.10 |  |  |
| α,α'-bis(tert.butyl peroxy)-diisopropylbenzene, parts | 1.2 | 0.8 | 1.25 | 1.25 | 1.5 | 1.63 |
| Vulcanization temperature, ° C | 160 | 160 | 165 | 165 | 160 | 165 |
| Vulcanization time, minutes | 40 | 40 | 30 | 30 | 40 | 40 |
| Tensile strength, kg./cm.$^2$ | 78 | 135 | 140 | 165 | 160 | 50 |
| Elongation at break, percent | 350 | 600 | 500 | 370 | 480 | 380 |
| Modulus at 300%, kg./cm.$^2$ | 28 | 30 | 41 | 132 | 87 | 37 |
| Residual elongation at 200%, percent | 13 | 12 | 10 | 8 | 10 | 12 |

EXAMPLE 12

By reacting, as in Example 1, tert. butyl hydroperoxide with a hydrocarbon mixture containing 41.7% of para-diisopropylbenzene and 57.8% of meta-diisopropylbenzene and by eliminating the volatile substances, there was obtained a mixture of the corresponding isomeric diperoxides, α, α'-bis (tert.butyl peroxy) diisopropylbenzene, having an active oxygen content corresponding to a diperoxide concentration of 65%. On the basis of this content, 2.5 g. of said mixture were added to a mix containing 100 g. of the ethylene-propylene copolymer used in Example 7, 50 g. of HAF carbon black and 0.25 g. of sulfur.

The mix obtained was vulcanized in a press at 165° C. for 40 minutes. The vulcanized product, tested as in Example 7, had the following properties:

Tensile strength, kg./cm.$^2$ _____ 190
Elongation at break, percent _____ 420
Modulus at 300%, kg./cm.$^2$ _____ 116
Residual elongation at 200%, percent _____ 7

EXAMPLE 13

This example is given to show that the conventional diperoxides which do not have the structure of the diperoxides used in this invention, i.e., do not have both of the peroxidic radicals bound to tertiary carbon atoms, act in the vulcanization as monoperoxides and have a very low vulcanizing efficiency.

A mix was prepared consisting of:

Ethylene-propylene copolymer—100 g.
HAF carbon black—50 g.
Sulfur—0.00962 gram atoms
Bis(tert.butyl peroxy)durene—0.00481 mol and was vulcanized by heating at 165° C. for 40 minutes.

The mechanical characteristics of the vulcanized product were:

Tensile strength, kg./cm.$^2$ _____ 30
Elongation at break, percent _____ 800
Modulus at 300%, kg./cm.$^2$ _____ 14
Permanent elongation at 200%, percent _____ 74

It may be seen from the above values that the product was scarcely vulcanized.

A second mix was then prepared using the same quantities of ingredients given above with the exception that now 0.00962 mol of the diperoxide were used: Even with a double quantity of diperoxide, using the same amount of sulfur, the mechanical characteristics of the vulcanized product were very poor.

The following examples are presented to show the excellent results obtained when vulcanizing at high temperatures in a eutectic salt mixture. In these examples, the vulcanizations were performed for the times and temperatures indicated in the tables by passing an extrudate comprising the mixture set forth in the examples through a "Hitec" eutectic salt mixture comprising 40% NaNO$_2$, 7% NaNO$_3$ and 53% KNO$_3$.

EXAMPLE 14

The following mixture was extruded and then vulcanized under the conditions and with the results set forth in Table V by passing the extrudate through a eutectic salt mixture for the times and at the temperatures indicated.

Parts by wt.
Ethylene-propylene copolymer having a propylene content of 45% by mols and a viscosity ML (1+4)100° C.=35 _____ 100
FEF carbon black _____ 70
2,2,4-trimethyl-1,2-dihydroquinoline polymerized __ 0.5
Caloxol W-3[1] _____ 15
Sulfur _____ 0.35
α,α'-bis(tert.butylperoxy)diisopropylbenzene _____ 2

[1] Commercial product of John & E. Sturge Ltd.:

| | Percent |
|---|---|
| CaO | 75 |
| Mineral oil | 16 |
| Paraffinic wax | 9 |

TABLE V

| Vulcanization in molten salt mixture | 1a | 2a | 3a | 4a | 5a | 6a | 1b | 2b | 3b | 4b | 5b | 6b |
|---|---|---|---|---|---|---|---|---|---|---|---|---|
| Vulcanization time, seconds | 30 | 60 | 90 | 120 | 240 | 360 | 30 | 60 | 90 | 120 | 240 | 360 |
| Vulcanization temperature, ° C. | 210° | | | | | | 220° | | | | | |
| Tensile strength, kg./cm.$^2$ | 120 | 142 | 149 | 136 | 134 | 143 | 140 | 137 | 131 | 135 | 131 | 137 |
| Elongation at break, percent | 425 | 310 | 320 | 325 | 320 | 325 | 330 | 335 | 325 | 325 | 345 | 335 |
| Modulus at 200%, kg./cm.$^2$ | 89 | 137 | 142 | 128 | 128 | 136 | 131 | 126 | 119 | 127 | 116 | 126 |
| Permanent elongation at 200%, percent | 12 | 9 | 8.5 | 9.5 | 10 | 10 | 9.5 | 9 | 10 | 10.5 | 10.5 | 11 |
| Vulcanization in molten salt mixture | 1c | 2c | 3c | 4c | 5c | 6c | 1d | 2d | 3d | 4d | 5d | 6d |
| Vulcanization time, seconds | 30 | 60 | 90 | 120 | 240 | 360 | 30 | 60 | 90 | 120 | 240 | 360 |
| Vulcanization temperature, ° C. | 230° | | | | | | 240° | | | | | |
| Tensile strength, kg./cm.$^2$ | 139 | 134 | 132 | 131 | 130 | 132 | 138 | 133 | 129 | 121 | 122 | 119 |
| Elongation at break, percent | 330 | 330 | 355 | 345 | 335 | 350 | 330 | 350 | 345 | 365 | 350 | 365 |
| Modulus at 200%, kg./cm.$^2$ | 130 | 124 | 116 | 117 | 120 | 117 | 127 | 119 | 116 | 105 | 108 | 102 |
| Permanent elongation at 200%, percent | 10.5 | 11.5 | 12 | 11 | 11 | 11.5 | 10.5 | 11.5 | 11.5 | 13 | 14 | 13.5 |

EXAMPLE 15

The following mixture was extruded and then vulcanized under the conditions and with the results set forth in Table VI by passing the extrudate through a eutectic salt mixture for the times and at the temperatures indicated.

|  | Parts by wt. |
|---|---|
| Ethylene/propylene (46% by mols)/5-methyl 4,7,8,9-tetrahydroindene (2% by mols) ML(1+4) at 100° C.=80 | 70 |
| Polyalkylbenzene (Preadix 8)[1] | 30 |
| FEF carbon black | 70 |
| ZnO | 5 |
| Stearic acid | 0.5 |
| Caloxol W-3[2] | 15 |
| Sulfur | 0.4 |
| α,α'-bis(tert.butylperoxy)diisopropylbenzene | 2.1 |

[1] Polyalkylbenzene—Commercial product of I.C.I.R.—Turine, Italy.
[2] See footnote 1, column 12.

the following vulcanized products were prepared and tested as described in that example:

| | | |
|---|---|---|
| Ethylene-propylene copolymer, g | 100 | 100 |
| Carbon black HAF, g | 50 | 50 |
| p-Quinone dioxime dibenzoate, g | 1 | 1 |
| α,α'-bis(tert. butylperoxy)-diisopropyl benzene, g | 0.8 | |
| α,α'-bis(cumyl peroxy)-diisopropyl benzene, g | | 1.1 |
| After vulcanization at 165° C. for 40 min.: | | |
| Tensile strength, kg./cm.² | 175 | 171 |
| Elongation at break, percent | 340 | 360 |
| Modulus at 300%, kg./cm.² | 115 | 109 |
| Residual elongation at 200%, percent | 10 | 11 |

EXAMPLE 18

From the ethylene-propylene copolymer of Example 8, the following mix was prepared and then vulcanized and handled as described in Example 6:

Ethylene-propylene copolymer—100 parts
Carbon black HAF—50 parts
N,N'-p-phenylendimaleimide (0.015 mol)—4 parts

TABLE VI

| Vulcanization in molten salt mixture | 1a | 2a | 3a | 4a | 5a | 6a | 1b | 2b | 3b | 4b | 5b | 6b |
|---|---|---|---|---|---|---|---|---|---|---|---|---|
| Vulcanization time, seconds | 30 | 60 | 90 | 120 | 240 | 360 | 30 | 60 | 90 | 120 | 240 | 360 |
| Vulcanization Temperature, °C. | 210° | | | | | | 220° | | | | | |
| Tensile strength, kg./cm.² | 128 | 134 | 142 | 138 | 133 | 137 | 133 | 141 | 129 | 138 | 128 | 124 |
| Elongation at break, percent | 350 | 270 | 270 | 275 | 275 | 275 | 270 | 295 | 275 | 290 | 290 | 310 |
| Modulus at 200%, kg./cm.² | 76 | 100 | 108 | 102 | 98 | 102 | 100 | 96 | 95 | 96 | 88 | 81 |
| Modulus at 300%, kg./cm.² | 115 | | | | | | | | | | | 118 |
| Permanent elongation at 200%, percent | 9.5 | R | 7.5 | 6.5 | 7 | 7 | 7.5 | 7.5 | 8 | 7.5 | 7 | 7.5 |

| Vulcanization in molten salt mixture | 1c | 2c | 3c | 4c | 5c | 6c | 1d | 2d | 3d | 4d | 5d | 6d |
|---|---|---|---|---|---|---|---|---|---|---|---|---|
| Vulcanization time, seconds | 30 | 60 | 90 | 120 | 240 | 360 | 30 | 60 | 90 | 120 | 240 | 360 |
| Vulcanization temperature, °C. | 230° | | | | | | 240° | | | | | |
| Tensile strength, kg./cm.² | 139 | 138 | 129 | 135 | 127 | 129 | 125 | 124 | 130 | 122 | 118 | 119 |
| Elongation at break, percent | 275 | 285 | 280 | 305 | 285 | 335 | 305 | 310 | 315 | 335 | 315 | 355 |
| Modulus at 200%, kg./cm.² | 101 | 98 | 91 | 92 | 89 | 80 | 80 | 80 | 81 | 75 | 75 | 66 |
| Modulus at 300%, kg./cm.² | | | | 133 | | 121 | 124 | 121 | 125 | 117 | 114 | 105 |
| Permanent elongation at 200%, percent | 7 | 8 | 8 | 7.5 | 7.5 | 9 | 7.5 | 7.5 | 8 | 9.5 | 8.5 | 9.5 |

EXAMPLE 16

This example illustrates the higher vulcanization rate and greater vulcanization efficiency achieved by using a diperoxide in accordance with the present invention (α,α'-bis(tert.butylperoxy)diisopropylbenzene) in the vulcanization of a low unsaturation terpolymer as compared to using an equimolar amount of a prior art diperoxide (2,5-bis(tert.butylperoxy)-2,5-dimethylhexane) at the same temperatures.

The following mixtures were vulcanized for the times and under the conditions set forth in Table VII, the results being set forth in the lower portion of Table VII.

α,α'-bis(tert.butylperoxy) diisopropylbenzene (0.015 mol)—0.51 part
After vulcanization at 165° C. for 30 min.:
  Tensile strength, kg./cm.²—186
  Elongation at break, percent—390
  Modulus at 300%, kg./cm.²—125
  Residual elongation at 200%, percent—11

EXAMPLE 19

The following mixture was extruded and then vulcanized under the conditions and with the results set forth in Table VIII by passing the extrudate through a eutectic salt mixture at the temperature of 250° C. for the time indicated.

TABLE VII

| | A | | | | | | | B | | | | | | |
|---|---|---|---|---|---|---|---|---|---|---|---|---|---|---|
| Ethylene/propylene (43 mol percent)/5-methyltetrahydroindene (4.3 mol percent) terpolymer ML(1+4) 100° C.=65 | 75 | | | | | | | 70 | | | | | | |
| Polyalkylbenzene (Preadix 8) | 30 | | | | | | | 30 | | | | | | |
| HAF carbon black | 60 | | | | | | | 60 | | | | | | |
| Sulfur | 0.4 | | | | | | | 0.4 | | | | | | |
| α,α'-bis(tert.butyl peroxy) diisopropylbenzene | 2.1 | | | | | | | | | | | | | |
| 2,5-bis(tert.butyl peroxy)-2,5-dimethylhexane | | | | | | | | 1.8 | | | | | | |
| Vulcanization conditions | (¹) | Injection press at 200° C. | | | | | | (¹) | Injection press at 200° C. | | | | | |
| Time, minutes | 40 | 0.5 | 1 | 2 | 4 | 6 | 10 | 60 | 0.5 | 1 | 2 | 4 | 6 | 10 |
| Tensile strength, kg./cm.² | 175 | 168 | 165 | 164 | 158 | 158 | 158 | 120 | 145 | 153 | 147 | 137 | 137 | |
| Elongation at break, percent | 270 | 400 | 325 | 300 | 360 | 360 | 375 | 515 | 580 | 620 | 660 | 665 | 670 | 675 |
| Modulus at 200%, kg./cm.² | 114 | 53 | 64 | 72 | 63 | 59 | 53 | 43 | 25 | 28 | 27 | 23 | 21 | 20 |
| ISO hardness | 69 | 60 | 65 | 65 | 64 | 63 | 63 | 63 | 63 | 55 | 55 | 55 | 54 | 55 |

¹ Plate press at 165° C.

EXAMPLE 17

From the ethylene-propylene copolymer of Example 7,

| | Parts by weight |
|---|---|
| Ethylene/propylene (43.5% by mols)/5-methyl-4,7,8,9-tetrahydroindene (5% by mols) ML(1+4) at 100° C.=104 | 70 |
| Polyalkylbenzene (Preadix 8) | 30 |
| FEF carbon black | 70 |
| ZnO | 5 |
| Stearic acid | 0.5 |
| Caloxol W-3 | 15 |
| Sulfur | 0.5 |
| α,α'-bis(tert.butylperoxy)diisopropylbenzene | 3.5 |

TABLE VIII.—VULCANIZATION IN MOLTEN SALT MIXTURE

| | Vulcanization time (seconds) | | | | |
|---|---|---|---|---|---|
| | 5 | 10 | 15 | 30 | 60 |
| Tensile strength, kg./cm.² | 110 | 135 | 140 | 145 | 140 |
| Elongation at break, percent | 240 | 210 | 225 | 250 | 240 |
| Modulus at 200%, kg./cm.² | 87 | 120 | 114 | 110 | 108 |
| Permanent elongation percent at 200% | 5 | 5 | 5 | 5 | 5 |

EXAMPLE 20

The following mixture was vulcanized under the conditions and with the results set forth in Table IX by vulcanizing in an injection press at 220° C. for the time indicated.

| | Parts by weight |
|---|---|
| Ethylene/propylene (46% by mols)/5-methyl-4,7,8,9-tetrahydroindene (4%) ML (1+4) at 100° C.=75 | 70 |
| Polyalkylbenzene (Preadix 8) | 30 |
| HAF carbon black | 60 |
| Sulfur | 0.4 |
| α,α'-bis(tert.butylperoxy) diisopropylbenzene | 2.1 |
| α,α'-Bis(tert.butylperoxy) diisopropylbenzene | 2.1 |

TABLE IX.—INJECTION PRESS

| | Vulcanization time (seconds) | | | | |
|---|---|---|---|---|---|
| | 20 | 30 | 60 | 90 | 120 |
| Tensile strength, kg./cm.² | 177 | 189 | 184 | 175 | 181 |
| Elongation at break, percent | 485 | 440 | 490 | 405 | 450 |
| Modulus at 300%, kg./cm.² | 79 | 106 | 98 | 109 | 99 |
| Permanent elongation percent at 200% | 8.5 | 5.5 | 6 | 5 | 5.5 |
| IRHD Hardness | 50 | 51 | 53 | 54 | 53 |

EXAMPLE 21

From an ethylene/propylene/5-methylen-norbornene terpolymer containing 41% by mols of propylene and 3.1% by mols of 5-methylen-norbornene and having a Mooney viescosity of 91 ML (1+4) at 100° C. the following mix was prepared in a roll mixer:

| | Parts by wt. |
|---|---|
| Ethylene/propylene/5-methylen-norbornene terpolymer | 100 |
| SRF carbon black | 60 |
| Sulfur | 0.16 |
| α,α'-bis(tert.butylperoxy)diisopropylbenzene | 1 |

This mix was vulcanized by heating at 165° C. for 40 minutes.

The mechanical characteristcs of the vulcanized product were:

| | |
|---|---|
| Tensile strength, kg./cm.² | 130 |
| Elongation at break, percent | 380 |
| Modulus at 300%, kg./cm.² | 102 |
| Permanent elongation at 200%, percent | 12 |

EXAMPLE 22

The following mixture was vulcanized in an injection press at 210° C. for 5 minutes:

| | Parts by wt. |
|---|---|
| Ethylene/propylene (44% by mols)/dicyclopentadiene (3.8% by mols)terpolymer ML (1+4) at 100° C.=73 | 100 |
| HAF carbon black | 50 |
| Sulfur | 0.16 |
| α,α' - bis(tert.butylperoxy)diisopropylbenzene | 1 |

The mechanical characteristics of the vulcanized product were:

| | |
|---|---|
| Tensile strength, kg./cm.² | 176 |
| Elongation at break, percent | 475 |
| Modulus at 300%, kg./cm.² | 94 |
| Permanent elongation at 200%, percent | 14.5 |

Variations can, of course, be made without departing for the spirit and scope of the invention.

Having thus described our invention, what we desire to secure by Letters Patent and hereby claim is:

1. A vulcanizable composition comprising (1) a vulcanizable saturated elastomeric copolymer of ethylene with a higher alpha-olefin having the formula $CH_2=CHR$ in which R is a lower alkyl radical, said copolymer having an ethylene content of from about 5 to 70 mol percent the molecular weight of said copolymer being between about 60,000 and 800,000; (2) a diperoxide having the general formula:

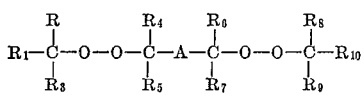

in which $R_2$ to $R_9$, inclusive, are selected from the group consisting of unsubstituted and halogen-substituted lower alkyl radicals, $R_1$ and $R_{10}$ are selected from the group consisting of unsubstituted and substituted alkyl radicals containing from 1 to 6 carbon atoms and unsubstituted and substituted aromatic radicals containing from 6 to 20 carbon atoms, and A is an arylene radical selected from the group consisting of phenylene, diphenylene, anthrylene and naphthylene, in a concentration of from about 0.002 to 0.02 mols of diperoxide per 100 grams of said vulcanizable copolymer; and (3) a radical acceptor selected from the group consisting of sulfur, quinone compounds and dimaleimidic compounds, in a concentration of from 0.1 to 20 grams per 100 grams of the vulcanizable copolymer.

2. The vulcanizable composition of claim 1 wherein the radical acceptor is sulfur.

3. The vulcanizable composition of claim 2 wherein the sulfur is present in a concentration of between 1.6 and 2.0 gram-atoms per mol of the diperoxide.

4. The vulcanizable composition of claim 1 wherein the vulcanizable polymer is an ethylene/propylene copolymer.

5. The vulcanizable composition of claim 1 wherein the vulcanizable polymer is an ethylene/butene copolymer.

6. The vulcanizable composition of claim 1 wherein the diperoxide is selected from the group consisting of α,α'-bis(tert.butyl peroxy)diisopropylbenzene and α,α'-bis(cumyl peroxy)diisopropylbenzene.

7. A process for vulcanizing the composition of claim 1 which comprises homogenizing said composition and vulcanizing it at a temperature of from about 110° to 260° C. for a time of from about 30 seconds to about 6 hours.

8. The process of claim 7 wherein said composition is vulcanized at a temperature of from about 150° to 200° C. for a time of from about 30 minutes to about 4 hours.

9. The process of claim 7 wherein said composition is vulcanized at a temperature of from about 200° to 250° C. for a time of from about 30 seconds to about 6 minutes.

10. The process of claim 9 wherein the vulcanization is performed by passing an extrudate of said composition through a eutectic salt mixture maintained at said temperature, said eutectic salt mixture comprising about 40 weight percent $NaNO_2$, about 7 weight percent $NaNO_3$ and about 53 weight percent $KNO_3$.

11. The process of claim 7 wherein said composition comprises a diperoxide selected from the group consisting of α,α'-bis(tert.butyl peroxy)diisopropylbenzene and α,α'-bis(cumyl peroxy)diisopropylbenzene.

12. The process of claim 11 wherein said composition further comprises a copolymer selected from the group consisting of ethylene/propylene and ethylene/butene copolymers.

13. Molded and extruded articles of vulcanized elastomers obtained by culcanizing the composition of claim 1.

14. The composition of claim 1, said composition additionally comprising a reinforcing filler.

15. The composition of claim 14, wherein said filler is carbon black.

References Cited

UNITED STATES PATENTS

| | | | |
|---|---|---|---|
| 3,317,454 | 5/1967 | Pedretti | 260—33.4 |
| 3,297,795 | 1/1967 | Peter et al. | 260—897 |
| 3,118,866 | 1/1964 | Gregorian | 260—94.9 |
| 3,093,620 | 6/1963 | Gladding et al. | 260—79.5 |
| 3,047,552 | 7/1962 | Reynolds et al. | 260—88.2 |
| 3,012,020 | 12/1961 | Kirk et al. | 260—88.2 |
| 3,012,016 | 12/1961 | Kirk et al. | 260—79.5 |

FOREIGN PATENTS

| | | |
|---|---|---|
| 975,724 | 11/1964 | Great Britain. |
| 928,533 | 6/1963 | Great Britain. |

MURRAY TILLMAN, Primary Examiner

C. J. SECCURO, Assistant Examiner

U.S. Cl. X.R.

260—41, 80.78

PO-1050
(5/69)

UNITED STATES PATENT OFFICE
CERTIFICATE OF CORRECTION

Patent No. 3,522,225      Dated July 28, 1970

Inventor(s) Cesare Augusto Peri et al

It is certified that error appears in the above-identified patent and that said Letters Patent are hereby corrected as shown below:

Column 1, after line 13 and before line 14, insert the following paragraph:

--Claims priority, applications Italy, December 22, 1960, 21,949/60 and September 27, 1961, prov. 16,600.

Signed and sealed this 12th day of June 1973.

(SEAL)
Attest:

EDWARD M. FLETCHER, JR.
Attesting Officer

ROBERT GOTTSCHALK
Commissioner of Patents